(12) United States Patent
Wang et al.

(10) Patent No.: US 12,522,030 B2
(45) Date of Patent: Jan. 13, 2026

(54) TIRE SELF-POSITIONING SYSTEM AND POSITIONING METHOD THEREFOR

(71) Applicant: BAOLONG HUF SHANGHAI ELECTRONIC CO., LTD., Shanghai (CN)

(72) Inventors: Xu Wang, Shanghai (CN); Weihua Shi, Shanghai (CN); Zhiwei Ren, Shanghai (CN)

(73) Assignee: BAOLONG HUF SHANGHAI ELECTRONIC CO., LTD., Shanghai (CN)

( * ) Notice: Subject to any disclaimer, the term of this patent is extended or adjusted under 35 U.S.C. 154(b) by 147 days.

(21) Appl. No.: 18/684,131

(22) PCT Filed: Mar. 25, 2022

(86) PCT No.: PCT/CN2022/083068
§ 371 (c)(1),
(2) Date: Feb. 15, 2024

(87) PCT Pub. No.: WO2023/019951
PCT Pub. Date: Feb. 23, 2023

(65) Prior Publication Data
US 2024/0217277 A1     Jul. 4, 2024

(30) Foreign Application Priority Data
Aug. 16, 2021   (CN) .......................... 202110937937.1

(51) Int. Cl.
*B60C 23/04*     (2006.01)

(52) U.S. Cl.
CPC ...... *B60C 23/0416* (2013.01); *B60C 23/0471* (2013.01); *B60C 23/0488* (2013.01)

(58) Field of Classification Search
None
See application file for complete search history.

(56) References Cited

U.S. PATENT DOCUMENTS

2014/0172241 A1    6/2014   Shima et al.

FOREIGN PATENT DOCUMENTS

| | | |
|---|---|---|
| CN | 102896984 A | 1/2013 |
| CN | 103492200 A | 1/2014 |
| CN | 108909378 A | 11/2018 |
| CN | 113147279 A | 7/2021 |
| CN | 113459731 A | 10/2021 |
| WO | 0112453 A1 | 2/2001 |

OTHER PUBLICATIONS

International Search Report issued for International Patent Application No. PCT/CN2022/083068; Date of mailing: Jul. 5, 2022, 7 pages including English translation.

*Primary Examiner* — Thomas S Mccormack
(74) *Attorney, Agent, or Firm* — HSML P.C.

(57) ABSTRACT

A tire self-positioning system and a positioning method therefor. The tire self-positioning method includes the steps of: S1, data acquisition; S2, data conversion; S3, data compensation; S4, data statistics; S5, determining, according to a statistical result, a specific position of a tire corresponding to the first signal. The tire self-positioning system and positioning method therefor are used to solve the problem of a tire experiencing reverse movement, and increase the success rate of active learning.

10 Claims, 12 Drawing Sheets

TIRE SELF-POSITIONING SYSTEM AND POSITIONING METHOD THEREFOR

TECHNICAL FIELD

The present disclosure relates to the technical field of vehicle tire positioning, in particular to a tire self-positioning system and a positioning method therefor.

BACKGROUND

The tire condition detection system is a safety system that ensures the good operation of the vehicle. As a regulatory requirement, tire condition detection systems have developed rapidly in the automobile market in recent years. Because it can monitor the operating conditions of car tires in real time, it can issue timely warnings to the driver when tires have abnormal conditions such as air leakage or ultra-high temperature, thus minimizing tire damage and providing a good basis for safe vehicle operation. As an active safety system in cars, the tire condition monitoring system can not only prevent vehicle tire blowouts and avoid accidents, but also inflating the tires to the recommended standard pressure value which can also reduce the vehicle's fuel consumption and allow the tires to be used longer.

Generally, in order to accurately monitor the condition of each tire, when tire pressure or temperature of a certain tire is abnormal, it can correctly display the specific location, front left (FL), front right (FR), rear right (RR), and rear left (RL). After people install the tire condition detection system, they will first determine the installation location of the tire pressure detection device; this process of identifying the location of the tire condition detection device is usually called "tire condition detection system tire position learning." The tire position learning of the tire condition detection system is further divided into passive learning and active learning; the tire position learning achieved through special diagnostic instruments and other tools is called passive learning, the tire position learning completed by the tire condition detection system using devices that already exist on the vehicle without the need for additional auxiliary equipment is called "tire condition detection system active learning." Compared with passive learning, which requires professional personnel relying on study ID of special diagnostic tools, active learning can save installation time and can complete independent learning of tire positions without the need for after-sales professional personnel and special diagnostic instruments.

If the vehicle moves in the opposite direction during the process of tire position active learning, the tire condition detection device will fail to position.

SUMMARY

In view of the above-mentioned problems of the prior art, the present disclosure proposes a tire self-positioning system and positioning method therefor to solve the problem of reverse movement of tires and improving the success rate of active learning.

Specifically, the present disclosure provides a tire self-positioning method, comprising steps:

S1: data acquisition: acquiring a wireless signal and a wired signal of a tire, wherein the wireless signal can index a corresponding time when a first signal reaches a reference point, the first signal comprises at least acceleration information of the tire, the wired signal comprises a second signal and corresponding position information of the tire, and the second signal comprises at least rotation angle information of the tire;

S2: data conversion: calculating corresponding reference rotation angle information of the tire when the first signal reaches the reference point according to the wireless signal and the wired signal that are currently received;

S3: data compensation: compensating for the reference rotation angle information acquired after reverse rotation of the tire if the reverse rotation of the tire exists;

S4: data statistics: repeating steps S1 to S3, and performing deviation degree statistics on acquired queue of the reference rotation angle information S5: determining a specific position of the tire corresponding to the first signal according to statistical result.

In one embodiment of the present disclosure, a rotation angle information of the tire comprises an ABS teeth number rotated by the tire, obtaining the wired signal in S1, saving the ABS teeth number, and generating coded value, a plurality of the coded values forming a queue of the coded value;

in step S2, calculating the reference rotation angle information of the tire corresponding to the time when the first signal reaches a reference point based on the currently received wireless signal and wired signal, recording as a reference coded value;

in step S3, if there is reverse rotation of the tire, compensating for the reference coded value acquired after reverse rotation of the tire if the reverse rotation of the tire exists.

In one embodiment of the present disclosure, the step of compensating for the reference coded value in step S3 comprises:

S31, recording ABS teeth number at a beginning of reverse movement, recorded as AbsStart, recording ABS teeth number at an end of the reverse movement, recorded as AbsEnd;

S32, calculating a compensation value ABS, the compensation value ABS=[2*(AbsEnd+n*ABS_CODE_MAXVAL−AbsStart)]/ABS_CODE_MAXVAL taking remainder;

n is a natural number, adjusting n so that AbsEnd+n*ABS_CODE_MAXVAL is greater than AbsStart, ABS_CODE_MAXVAL is teeth number that the ABS increases by one rotation of the tire;

S33, compensating for acquired reference coded value after the tire reversely rotates, if current reference coded value ABS_ref≥compensation value ABS, then compensation the reference coded value ABS=reference coded value ABS_ref−compensation value ABS; if current reference coded value ABS_ref<compensation value ABS, then compensation reference coded value ABS=reference coded value ABS_ref+ABS_CODE_MAXVAL−compensation value ABS.

In one embodiment of the present disclosure, step S31 comprises:

S311, recording total ABS teeth number at the beginning of the reverse movement, recorded as AbsTotalStart, recording the total ABS teeth number at the end of the reverse movement, recorded as AbsTotalEnd;

S312, calculating ABS teeth number at the beginning of the reverse movement, AbsStart=AbsTotalStart/ABS_CODE_MAXVAL taking remainder, calculating ABS teeth number at the end of the reverse movement, AbsEnd=AbsTotalEnd/ABS_CODE_MAXVAL taking the remainder.

In one embodiment of the present disclosure, the step of compensating for the reference coded value in step S3 comprises:

S31', recording total ABS teeth number at a beginning of reverse movement, recorded as AbsTotalStart, recording the total number of ABS teeth at an end of the reverse movement, recorded as AbsTotalEnd;

S32', calculating a added cumulative ABS teeth number during the reverse movement, AbsTotalDelta=AbsTotalEnd-AbsTotalStart;

S33', compensating for acquired reference coded value after the tire reversely rotates, and compensation the reference coded value ABS=(reference code value ABS_ref (ABS_CODE_MAXVAL*n)-(2*AbsTotalDelta)]/ABS_CODE_MAXVAL taking remainder;

wherein, ABS_CODE_MAXVAL is the teeth number that ABS increases in one rotation of the tire, n is a natural number, and adjusting n to make the reference coded value ABS_ref+(ABS_CODE_MAXVAL*n) greater than 2*AbsTotalDelta.

In one embodiment of the present disclosure, in step S3, if the tire has n reverse rotations, the acquired reference coded value after n reverse rotations needs to be compensated, comprising the steps:

recording total ABS teeth number at a beginning of a first reverse movement, recorded as AbsTotalStart 1, recording the total ABS teeth number at an end of the first reverse movement, recorded as AbsTotalEnd 1, calculating an added ABS teeth number AbsTotalDelta 1=AbsTotalEnd 1-AbsTotalStart 1 during the first reverse movement;

according to the above steps, recording the ABS teeth number increased from a second reverse movement to an nth reverse movement, accumulating the ABS teeth number increased from the first reverse movement to the nth reverse movement, an increased accumulated ABS teeth number AbsTotalDelta=AbsTotalDelta 1+AbsTotalDelta 2+ . . . +AbsTotalDelta n;

adjusting the total ABS teeth number AbsTotalAdjusted= (reference coded value ABS_ref+ (ABS_CODE_MAXVAL*n)-2*AbsTotalDelta)/ABS_CODE_MAXVAL taking remainder, n is a natural number, adjusting the value of n so that the reference coded value ABS_ref+(ABS_CODE_MAXVAL*n) is greater than 2*AbsTotalDelta;

compensation reference coded value ABS=adjusted total ABS teeth number AbsTotalAdjusted/ABS_CODE_MAXVAL taking remainder;

the reference coded value ABS_ref is compensated by compensating the reference coded value ABS.

In one embodiment of the present disclosure, step S2 comprises:

S21, recording a time interval T1 of the currently received wireless signal and wired signal;

S22, obtaining a backtracking time T2 from the time when the first signal reaches the reference point to the time when the wireless signal is received;

S23, index time T3=backtracking time T2-time interval T1;

S24, calculating a number of coded values that need to be indexed back, which is the index time T3/the period of the second signal ABS_period rounded;

S25, recording the coded value ABS_search indexed in the queue of coded values according to number of backward indexes;

S26. modifying the coded value ABS_search and obtaining the reference coded value ABS_ref.

In one embodiment of the present disclosure, the backtracking time T2 is a set fixed value, or a specific value calculated by a specific algorithm.

Another aspect of the present disclosure also provides a tire self-positioning system, performing the tire self-positioning method according to claim 1, characterized in that, the tire self-positioning system comprises:

a tire;

a tire condition detection device, provided on the tire, configured to collect the first signal and pressure, temperature and identification code of the tire, and generating the wireless signal;

a second signal sensor, provided on the tire and configured to collect the second signal;

a second signal controller, electrically connected to the second signal sensor, the second signal controller receiving the second signal and generating a wired signal, the wired signal including a coded value corresponding to the second signal and the position information of the tire where the second signal sensor is located;

a communication bus and a signal receiving processor, the signal receiving processor receives the wired signal through the communication bus, the signal receiving processor receiving the wireless signal, the signal receiving processor performing steps S3 to S6 according to the wireless signal and the wired signal.

In one embodiment of the present disclosure, a first signal collection sensor is an acceleration sensor, and s second signal sensor is an ABS gear tooth pulse sensor.

This disclosure provides a tire self-positioning system and a positioning method therefor, which can improve the success rate of active learning and mainly solve the problem of data deviation caused by the reverse movement of tires.

It is to be understood that both the foregoing general description and the following detailed description of the disclosure are exemplary and explanatory and are intended to provide further explanation of the disclosure as claimed.

BRIEF DESCRIPTION OF THE DRAWINGS

The drawings are included to provide a further understanding of the present application, and they are included and constitute a part of the present application, the drawings show the embodiments of the present application, and serving to explain the principles of the present application together with the description. In the drawings.

PREFERRED EMBODIMENT OF THE PRESENT DISCLOSURE

Figure 1:
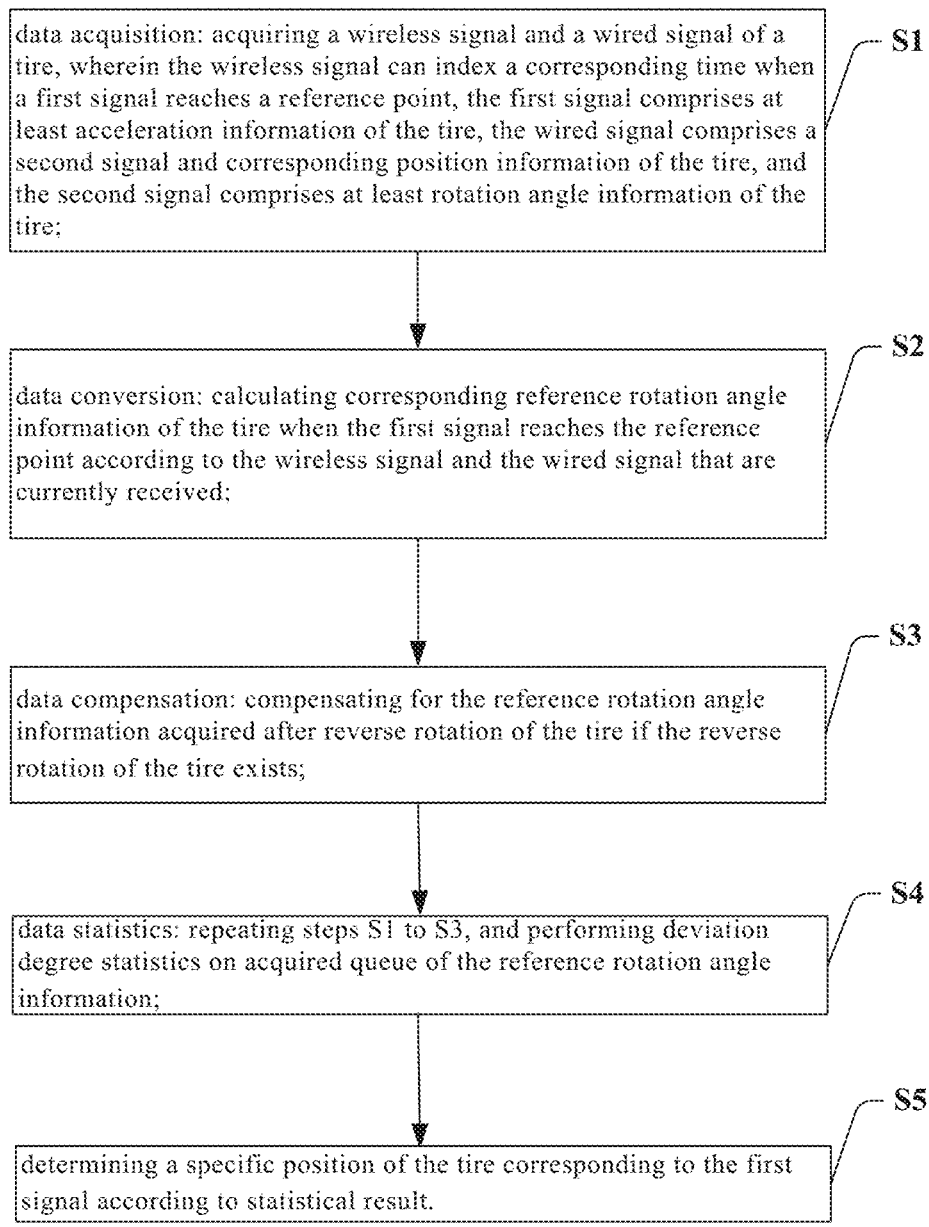
FIG. 1 shows a flow chart of a tire self-positioning method according to an embodiment of the present disclosure.

It should be noted that, as long as there is no conflict, the embodiments and features in the embodiments of this application can be combined with each other.

The technical solutions in the embodiments of the present application will be clearly and completely described below in conjunction with the drawings in the embodiments of the present application. Obviously, the described embodiments are parts of the embodiments of this application, but not all of them. Based on the embodiments in the present application, all other embodiments obtained by persons of ordinary skill in the art without making creative efforts belong to the protection scope of the present application.

It should be noted that the terms used herein are only for describing specific embodiments and are not intended to limit the exemplary embodiments according to the present application. As indicated in this application and claims, the terms "a", "an", "a kind of" and/or "the" do not specifically refer to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

In the description of the present application, it should be understood that orientation words such as "front, back, up, down, left, right", "landscape, portrait, vertical, horizontal" and "top, bottom" etc. indicating the orientation or positional relationship is generally based on the orientation or positional relationship shown in the drawings, only for the convenience of describing the application and simplifying the description, in the absence of a contrary statement, these orientation words do not indicate or imply that the device or element referred to must have a specific orientation or be constructed and operated in a specific orientation, and therefore cannot be construed as limiting the scope of protection of this application; the orientation words "inside and outside" refer to inside and outside relative to the outline of each part itself.

For the convenience of description, spatially relative terms may be used here, such as "on . . . ", "over . . . ", "on the upper surface of . . . ", "above", etc., to describe the spatial positional relationship between one device or feature and other devices or features. It will be understood that, in addition to the orientation depicted in the drawings, the spatially relative terms are intended to encompass different orientations of the device in use or operation. For example, if the device in the drawings is turned over, devices described as "on other devices or configurations" or "above other devices or configurations" would then be oriented "beneath other devices or configurations" or "under other devices or configurations". Thus, the exemplary term "above" can encompass both an orientation of "above" and "beneath". The device may be otherwise oriented (rotated 90 degrees or at other orientations), and making a corresponding explanation for the space relative description used here.

In addition, it should be noted that the use of words such as "first" and "second" to define components is only for the convenience of distinguishing corresponding components, unless otherwise stated, the above words have no special meanings, and therefore cannot be construed as limiting the protection scope of the present application. In addition, although the terms used in this application are selected from well-known and commonly used terms, some terms mentioned in the specification of this application may be selected by the applicant according to his or her judgment, and their detailed meanings are listed in this article described in the relevant section of the description. Furthermore, it is required that this application be understood not only by the actual terms used, but also by the meaning implied by each term.

First, the design idea of a tire self-positioning method provided by the present disclosure is briefly explained. Generally, taking a small car as an example, it contains four tires, front left (FL), front right (FR), rear right (RR), and rear left (RL). After installing the tire condition detection system on each tire, it is necessary to determine the installation location of the tire pressure detection device. During tire driving process, a wireless signal and a wired signal are acquired at the same reference point (same rotation angle) in any rotation cycle. The wireless signal is associated with a reference point of the acceleration signal, and the wired signal includes the ABS signal of the tire's teeth pulse sensor and the known tire position (eg FL) where the teeth pulse sensor is located. The actual teeth number information corresponding to the reference point is calculated based on the wired signal and wireless signal, and a queue of teeth number information is generated. For example, the wireless signal of a tire and the wired signal of the front left tire (FL), the wired signal of the front right tire (FR), the wired signal of the rear right tire (RR), and the wired signal of the rear right tire (RR) can form a queue of four sets of teeth number information. According to data statistics, the group of teeth number information with the smallest deviation, assuming that the wired signal of the front left tire (FL) has the smallest deviation, then the corresponding tire condition detection system is determined to be installed on the front left (FL). By analogy, the actual location of each tire condition detection system can be confirmed, thereby realizing active learning of the tire position of the tire condition detection system.

FIG. 1 shows a flow chart of a tire self-positioning method according to an embodiment of the present disclosure. As shown in FIG. 1, a tire self-positioning method provided by the present disclosure comprises the steps:

S1: data acquisition: acquiring a wireless signal and a wired signal of a tire, wherein the wireless signal can index a corresponding time when a first signal reaches a reference point, the first signal comprises at least acceleration information of the tire, the wired signal comprises a second signal and corresponding position information of the tire, and the second signal comprises at least rotation angle information of the tire;

S2: data conversion: calculating corresponding reference rotation angle information of the tire when the first signal reaches the reference point according to the wireless signal and the wired signal that are currently received;

S3: data compensation: compensating for the reference rotation angle information acquired after reverse rotation of the tire if the reverse rotation of the tire exists.

S4: data statistics: repeating steps S1 to S3, and performing deviation degree statistics on acquired queue of the reference rotation angle information S5: determining a specific position of the tire corresponding to the first signal according to statistical result.

Preferably, a rotation angle information of the tire comprises an ABS teeth number rotated by the tire, obtaining the wired signal in S1, saving the ABS teeth number, and generating coded value, a plurality of the coded values forming a queue of the coded value;

in step S2, calculating the reference rotation angle information of the tire corresponding to the time when the first signal reaches a reference point based on the currently received wireless signal and wired signal, recording as a reference coded value;

in step S3, if there is reverse rotation of the tire, compensating for the reference coded value acquired after reverse rotation of the tire if the reverse rotation of the tire exists.

Preferably, in step S3, if the tire has multiple reverse rotations, the obtained reference coded value after the reverse rotation is compensated after each reverse rotation.

Preferably, the coded value includes the ABS teeth number or the ABS angle corresponding to ABS teeth the number, the conversion formula between the ABS teeth number and the ABS angle is as follows:

AbsAngle=(AbsPhyCurrent/ABS_CODE_MAXVAL)*360, AbsAngle is the ABS angle, AbsPhyCurrent is the ABS teeth number, and ABS_CODE_MAXVAL is the teeth number that ABS increases in one rotation of the tire.

Figure 2:
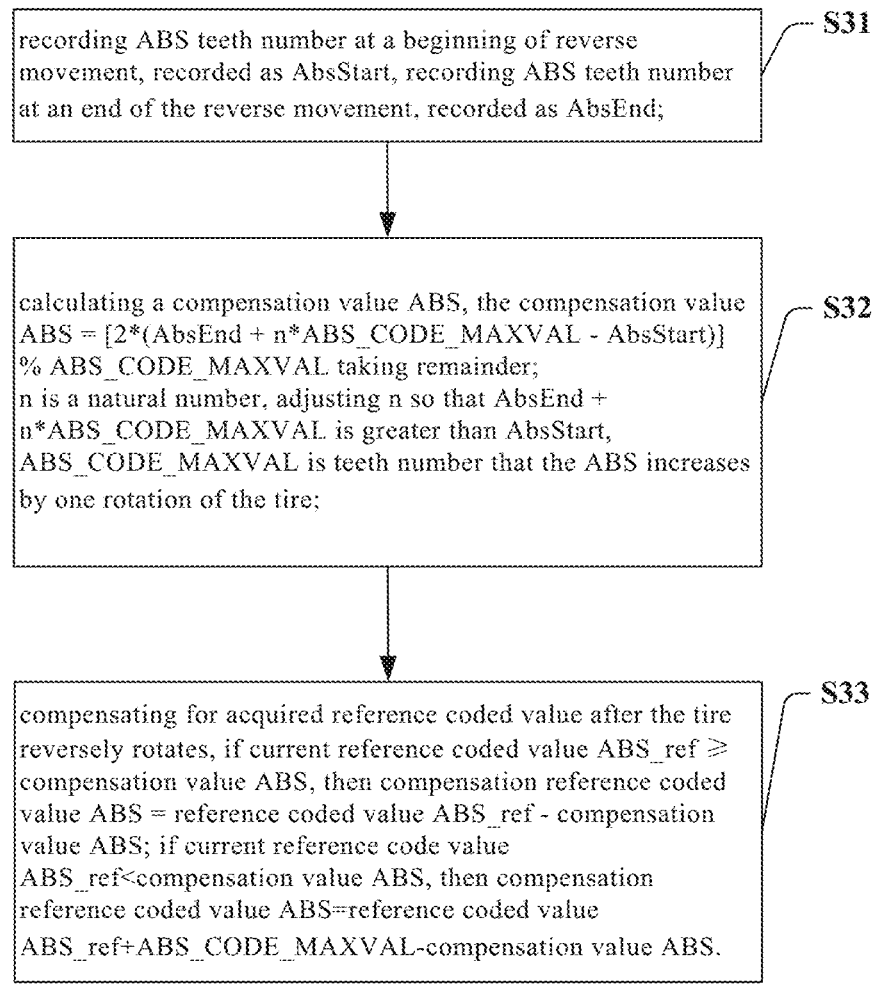
FIG. 2 shows the first flow chart of step S3 in the tire self-positioning method according to an embodiment of the present disclosure.

FIG. 2 shows the first flow chart of step S3 in the tire self-positioning method according to an embodiment of the present disclosure. Preferably, as shown in the figure, step S3 comprises:

S31, recording ABS teeth number at a beginning of reverse movement, recorded as AbsStart, recording ABS teeth number at an end of the reverse movement, recorded as AbsEnd;

S32, calculating a compensation value ABS, if AbsStart≤AbsEnd, the compensation value ABS=[2*(AbsEnd−AbsEnd)]/ABS_CODE_MAXVAL taking remainder; if AbsStart>AbsEnd, the compensation value ABS=ABS_CODE_MAXVAL−([2*(AbsStart−AbsEnd)])/ABS_CODE_MAXVAL taking remainder; ABS_CODE_MAXVAL is the added teeth number by ABS during one rotation of the tire;

S33, compensating for acquired reference coded value after the tire reversely rotates, if current reference coded value ABS_ref≥compensation value ABS, then compensation reference coded value ABS=reference coded value ABS_ref−compensation value ABS; if current reference coded value ABS_ref<compensation value ABS, then compensation reference coded value ABS=reference coded value ABS_ref+ABS_CODE_MAXVAL−compensation value ABS.

Preferably, step S31 comprises:

S311, recording total ABS teeth number at the beginning of the reverse movement, recorded as AbsTotalStart, recording the total ABS teeth number at the end of the reverse movement, recorded as AbsTotalEnd;

S312, calculating ABS teeth number at the beginning of the reverse movement, AbsStart=AbsTotalStart/ABS_CODE_MAXVAL taking remainder, calculating the ABS teeth number at the end of the reverse movement, AbsEnd=AbsTotalEnd/ABS_CODE_MAXVAL taking remainder.

Figure 3:
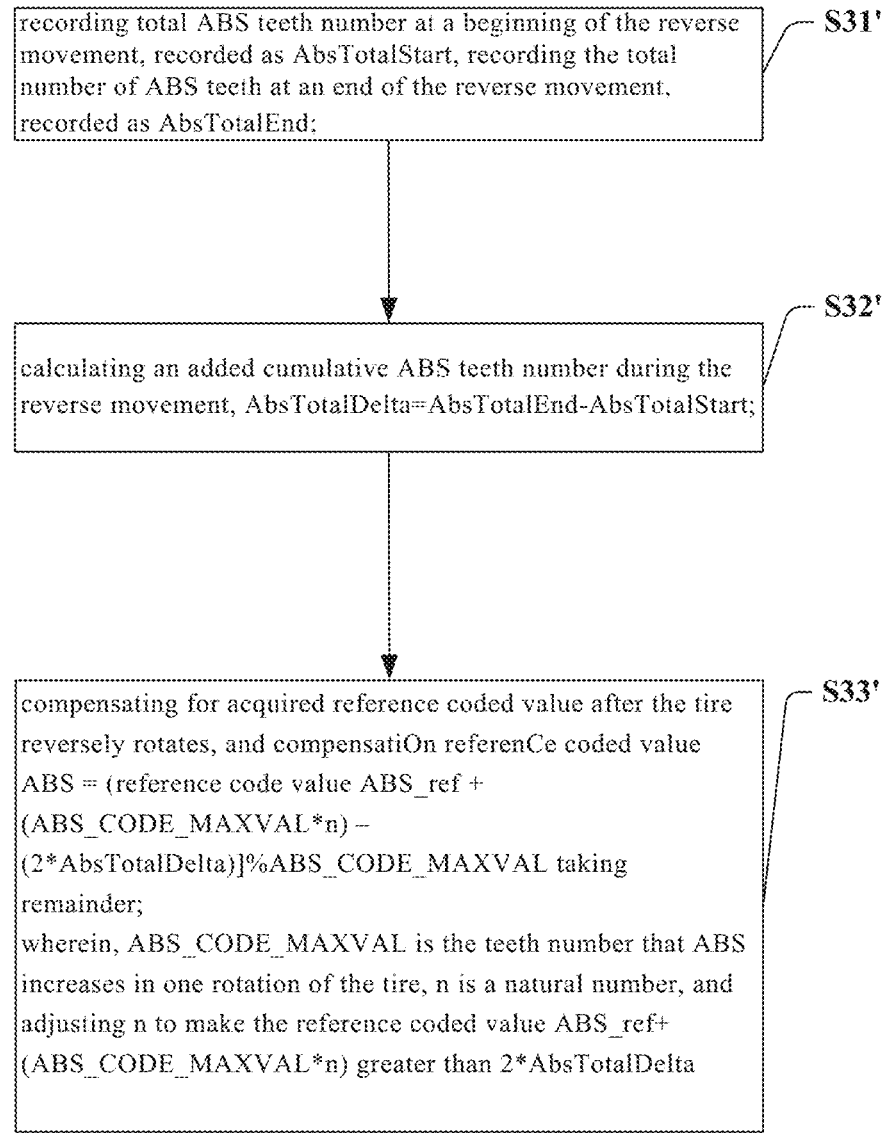
FIG. 3 shows the second flow chart of step S3 in the tire self-positioning method according to an embodiment of the present disclosure.

FIG. 3 shows the second flow chart of step S3 in the tire self-positioning method according to an embodiment of the present disclosure. Optionally, step S3 comprises:

S31', recording total ABS teeth number at a beginning of the reverse movement, recorded as AbsTotalStart, recording the total number of ABS teeth at an end of the reverse movement, recorded as AbsTotalEnd;

S32', calculating an added cumulative ABS teeth number during the reverse movement, AbsTotalDelta=AbsTotalEnd−AbsTotalStart;

S33', compensating for acquired reference coded value after the tire reversely rotates, and compensation reference coded value ABS=(reference code value ABS_ref+(ABS_CODE_MAXVAL*n)−(2*AbsTotalDelta)]/ABS_CODE_MAXVAL taking remainder;

wherein, ABS_CODE_MAXVAL is the teeth number that ABS increases in one rotation of the tire, n is a natural number, and adjusting n to make the reference coded value ABS_ref+(ABS_CODE_MAXVAL*n) greater than 2*AbsTotalDelta.

Preferably, in step S3, if the tire has n reverse rotations, the acquired reference coded value after n reverse rotations needs to be compensated, comprising the steps:

recording total ABS teeth number at a beginning of the first reverse movement, recorded as AbsTotalStart 1, recording the total ABS teeth number at an end of the first reverse movement, recorded as AbsTotalEnd 1, calculating an added ABS teeth number AbsTotalDelta 1=AbsTotalEnd 1−AbsTotalStart 1 during the first reverse movement;

according to the above steps, recording the ABS teeth number increased from a second reverse movement to an nth reverse movement, accumulating the ABS teeth number increased from the first reverse movement to the nth reverse movement, an increased accumulated ABS teeth number AbsTotalDelta=AbsTotalDelta 1+AbsTotalDelta 2+ . . . +AbsTotalDelta n;

adjusting the total ABS teeth number AbsTotalAdjusted=(reference coded value ABS_ref+(ABS_CODE_MAXVAL*n)−2*AbsTotalDelta)/ABS_CODE_MAXVAL taking remainder, n is a natural number, adjusting value of n so that the reference coded value ABS_ref+(ABS_CODE_MAXVAL*n) is greater than 2*AbsTotalDelta;

compensation reference coded value ABS=adjusted total ABS teeth number AbsTotalAdjusted/ABS_CODE_MAXVAL taking remainder;

the reference coded value ABS_ref is compensated by compensating the reference coded value ABS.

Figure 4:
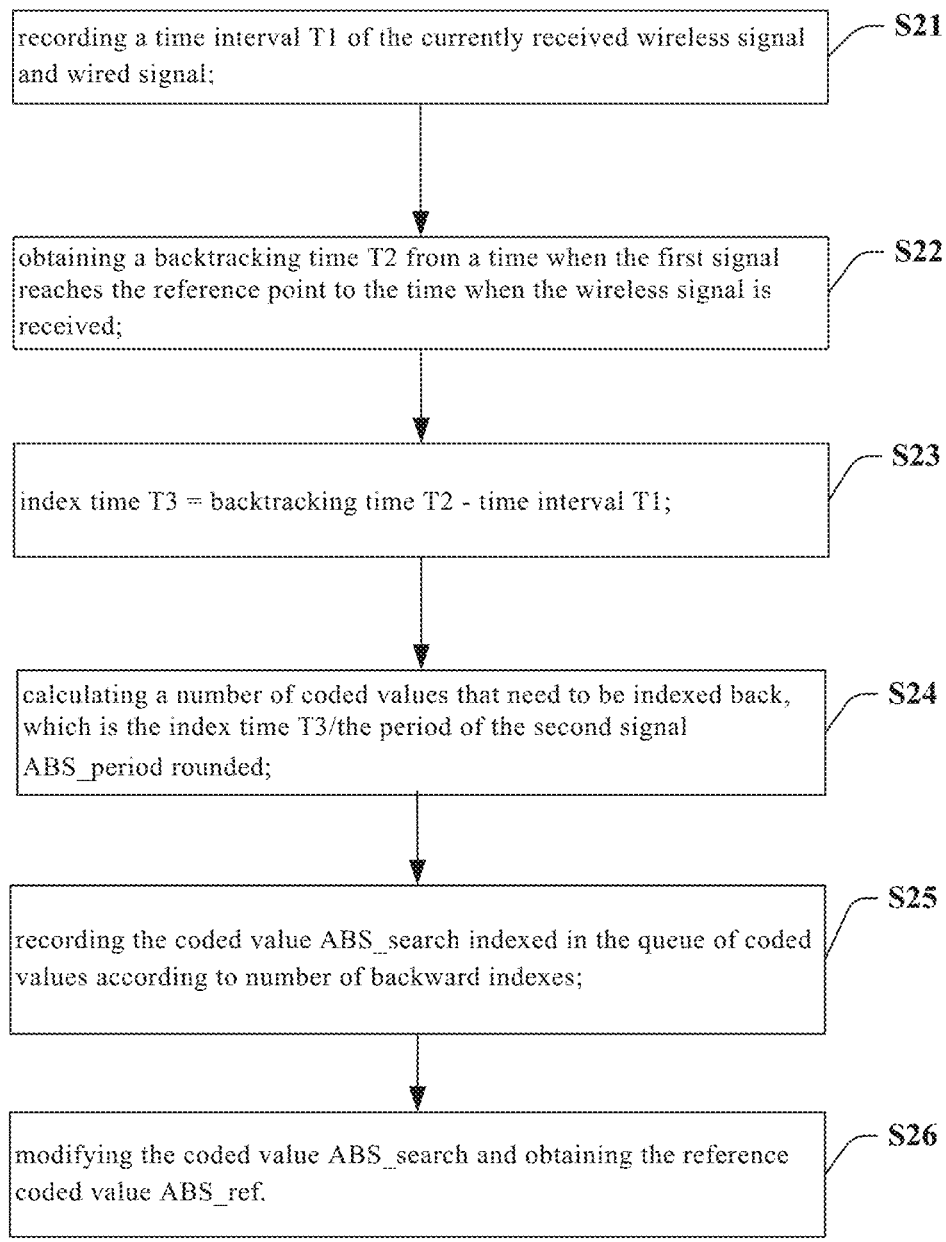
FIG. 4 shows a flow chart of step S2 in the tire self-positioning method according to an embodiment of the present disclosure.

FIG. 4 shows a flow chart of step S2 in the tire self-positioning method according to an embodiment of the present disclosure. Preferably, step S2 comprises:

S21, recording a time interval T1 of the currently received wireless signal and wired signal;

S22, obtaining a backtracking time T2 from a time when the first signal reaches the reference point to the time when the wireless signal is received;

S23, index time T3=backtracking time T2−time interval T1;

S24, calculating a number of coded values that need to be indexed back, which is the index time T3/the period of the second signal ABS_period rounded;

S25, recording the coded value ABS_search indexed in the queue of coded values according to number of backward indexes;

S26, modifying the coded value ABS_search and obtaining the reference coded value ABS_ref.

Preferably, step S26 comprises:

S261, calculating the time interval ΔT between the coded values ABS_search and ABS_ref=corrected index time T3/and the period ABS_period of the second signal taking remainder;

S262, calculating the difference value between the reference coded value ABS_ref and the coded value ABS_search: difference value ΔABS=(ΔT/ABS_period)*(ABS[n−number of backward indexes]−ABS[n−number of backward indexes−1]);

S263, calculating the reference coded value ABS_ref of the tire at which the first signal reaches the reference point=ABS[n−number of backward indexes]−ΔABS.

Preferably, the backtracking time T2 is a set fixed value, or a specific value calculated by a specific algorithm.

Preferably, the characteristic curve of the first signal is a sinusoidal curve, and a specific angle of the first signal is selected as the reference point. According to the characteristic curve of the first signal, the position of the reference point is determined, and the reference point may be the highest point or the lowest point of the first signal characteristic curve, or the position where the tire contacts the ground, or any other angular position. More preferably, the highest point of the sinusoidal curve of the first signal is selected as the reference point for data conversion.

Figure 5:
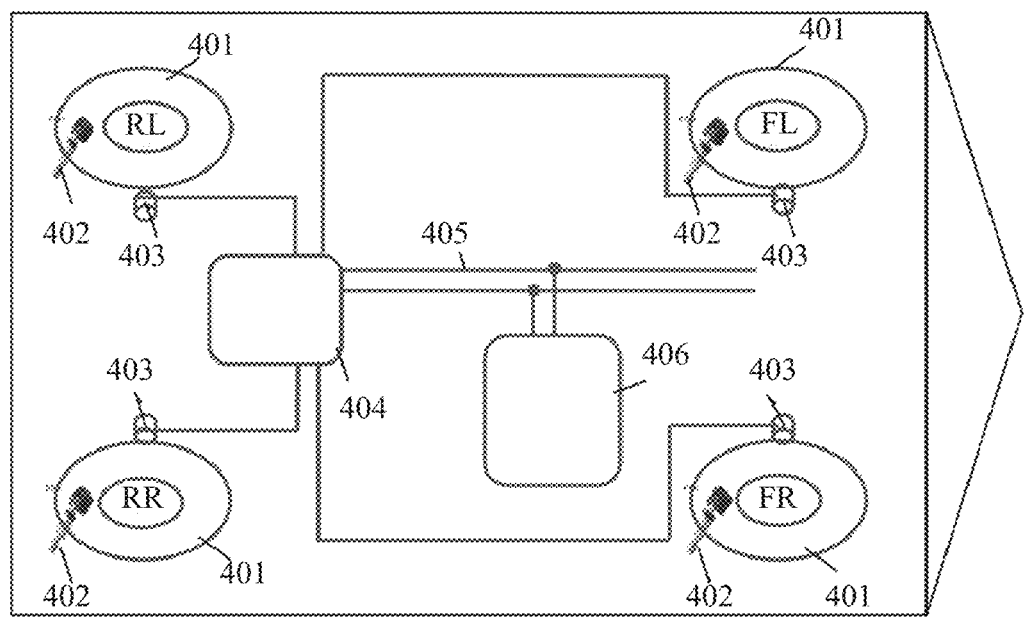
FIG. 5 shows a schematic structural view of a tire self-positioning system according to an embodiment of the present disclosure.

FIG. 5 shows a schematic structural view of a tire self-positioning system according to an embodiment of the present disclosure. As shown in the figure, the present disclosure also provides a tire self-positioning system 400, performing the tire self-positioning method above. The tire self-positioning system 400 comprises: a tire 401, a tire condition detection device 402, a second signal sensor 403, a second signal controller 404, a communication bus 405 and a signal receiving processor 406.

Wherein, the tire condition detection device 402 and the second signal sensor 403 are provided on the tire 401. The tire condition detection device 402 is configured to collect the first signal and pressure, temperature and identification code of the tire, and generate the wireless signal;

A second signal sensor 403 is configured to collect ABS teeth number rotated by the tire 401.

A second signal controller 404 is electrically connected to the second signal sensor 403. The second signal controller 404 receives the second signal and generates a wired signal, and the wired signal includes a coded value corresponding to the second signal and the position information of the tire 401 where the second signal sensor 403 is located;

The signal receiving processor 406 receives the wired signal through the communication bus 405. The signal receiving processor 406 receives the wireless signal at the same time. The signal receiving processor 406 performs steps S2 to S4 according to the wireless signal and the wired signal, and finally determines the specific position of the tire associated with the first signal. In an embodiment, communication bus 405 may be a CAN communication bus.

Preferably, the tire condition detection device 402 comprises a first signal collection sensor and a wireless transmission circuit. The first signal collection sensor is configured to collect the first signal, and the first signal is sent to the signal receiving processor 406 through the wireless transmission circuit. Generally, the tire condition detection device 402 is installed in the tire. The tire condition detection device 402 also includes a tire air pressure sensor, temperature sensor and so on. The tire condition detection device 402 can process the tire condition information collected by each sensor through the micro control unit integrated on its chip, and at the same time merging the collected tire pressure values, temperature values, etc. into wireless signals, and the signal is sent out by cooperating with the wireless transmitting circuit to transmit the wireless signal at the same time.

Figure 6:
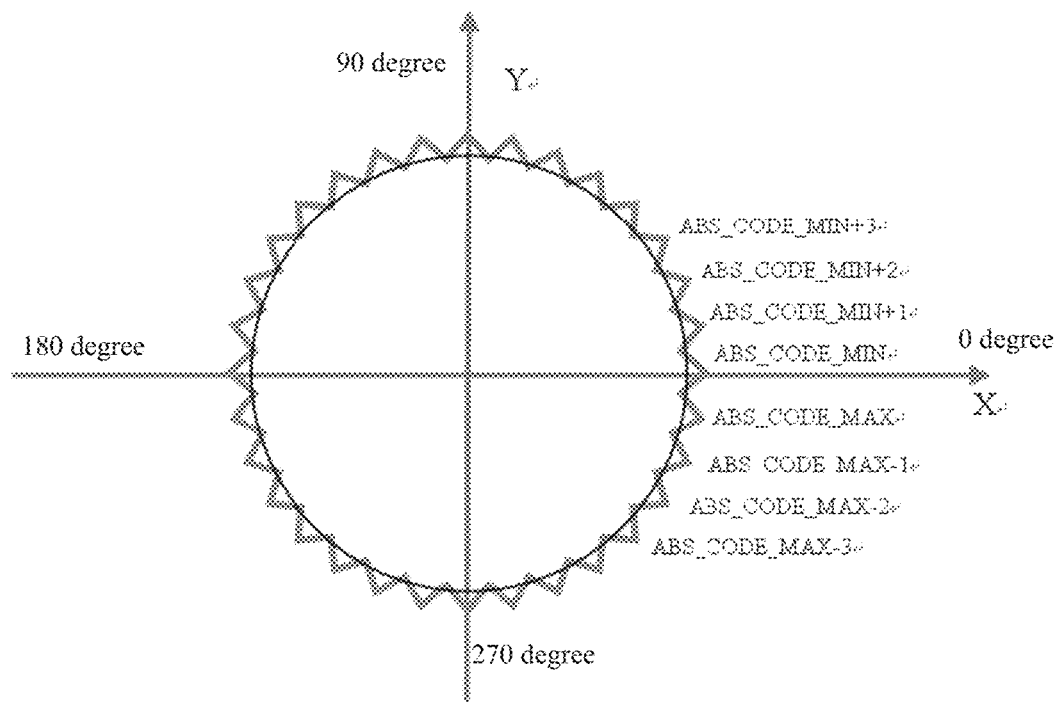
FIG. 6 shows a schematic view of the ABS teeth number according to one embodiment of the present disclosure.
Figure 7:
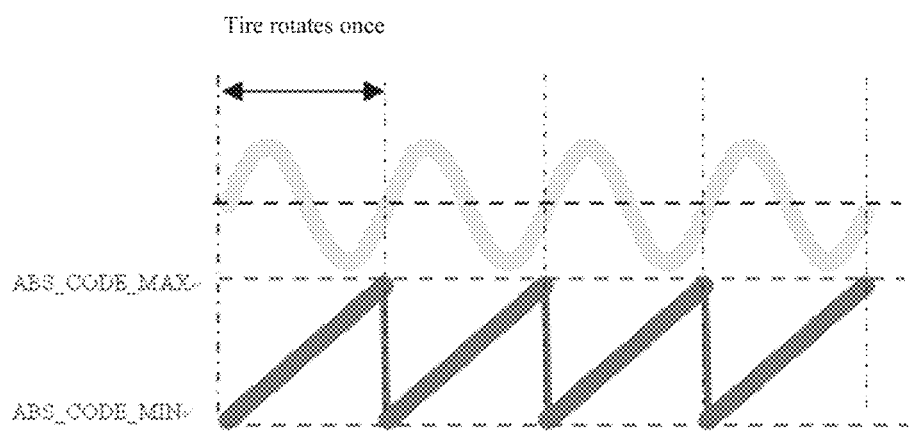
FIG. 7 shows characteristic curves of the first signal and the second signal according to an embodiment of the present disclosure.

Preferably, the first signal collection sensor is an acceleration sensor, the second signal sensor 403 is an ABS teeth pulse sensor of the anti-lock braking system. As the tire 401 rotates, the first signal shows sinusoidal characteristics. Conventionally, a vehicle has multiple tires 401, and in this embodiment, the vehicle has four tires 401, which are front left tire (FL), front right tire (FR), rear right tire (RR), and rear left tire (RL). Each tire is provided with a tire condition detection device 402, and each tire condition detection device 402 has a unique identification code, which is called the ID of the tire condition detection device 402. By way of example and not limitation, the wireless signal sent by the tire condition detection device 402 includes identification code, pressure, sending time, etc. Further, when the tire 401 is rolling, the gears of the anti-lock braking system will roll along with the tire 401, and the ABS teeth pulse sensor will collect the number of ABS teeth that have been rotated, and sending out the ABS teeth number information. Encoding the ABS teeth number information to form a coded value. FIG. 6 shows a schematic view of the ABS teeth number according to an embodiment of the present disclosure. As shown in the figure, taking the positive X-axis as the starting point, it is recorded as the minimum code ABS_CODE_MIN, counterclockwise, the code increases by 1 tooth for every tooth rotation of the tire until the tire rotates a cycle and the code reaches the maximum value ABS_CODE_MAX, and then the code starts from the minimum code again. In this embodiment, the number of gear teeth is 48, that is, ABS_CODE_MIN=0; ABS_CODE_MAX=47, each tooth of the tire 401 rotates to generate a pulse, therefore, the tire 401 generates 48 pulses when it rotates one cycle, and 96 pulses when it rotates two cycles. Since the same position of the tire condition detection device 402 and the gear roll with the tire, and because they are coaxial, the characteristic curves of the first signal and the second signal of the same tire 301 are always synchronized. FIG. 7 shows characteristic curves of the first signal and the second signal according to an embodiment of the present disclosure. As shown in the figure, the characteristic curve of the first signal (acceleration signal) is at the top, and the characteristic curve of the second signal (ABS teeth coded signal) is at the bottom, and the characteristic curve of the first signal and the characteristic curve of the second signal are synchronized.

Figure 8:
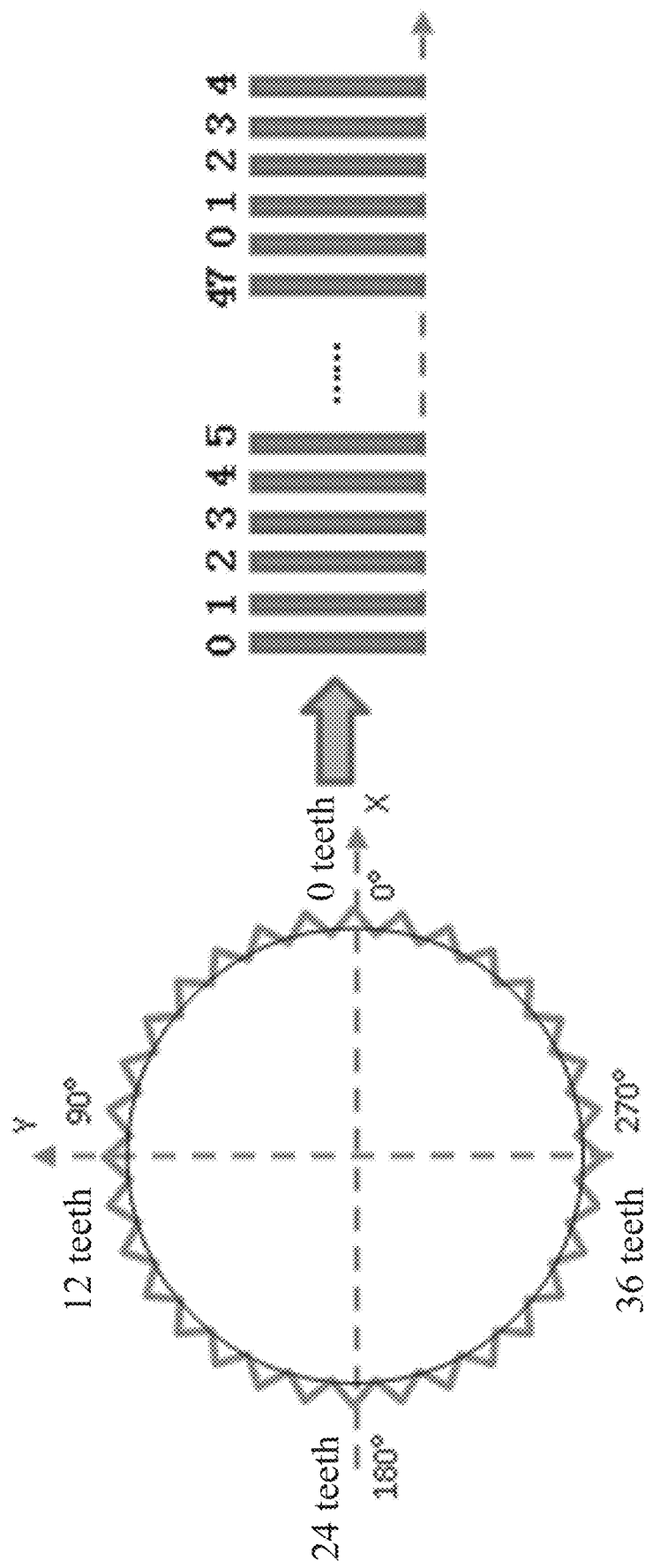
FIG. 8 shows a characteristic curve view of ABS encoding and ABS variables according to an embodiment of the present disclosure.

The second signal controller 404 receives the ABS teeth number data output by the second signal sensor 403, and stores the ABS teeth number data in an accumulated form into an internal variable; after the internal variable is accumulated to the maximum value ABS MAX of the ABS variable, it will restart counting from the minimum value ABS MIN of the ABS variable. The second signal controller 404 processes the ABS variables into a data format that complies with the bus protocol and roughly and periodically send them to the bus. FIG. 8 shows a characteristic curve of ABS coded values and ABS variables according to an embodiment of the present disclosure. The corresponding relationship between ABS coded value and ABS variable is: ABS coded value=(ABS variable)/ABS_CODE_MAX. For example: the value range of the ABS coded value can be 0-47; the value range of the ABS variable can be 0-47.

The signal receiving processor 406 is provided on the vehicle body side and is configured to receive wireless signals from each tire condition detection device 402 at any random time. The signal receiving processor 406 receives the wired signal from the second signal controller 404, and the wired signal includes second signal. The wired signal is generally periodic, and in this embodiment the wired signals include second signals at four positions of FL, FR, RR, and RL.

Preferably, the backtracking time T2 is a fixed value, included in the wireless signal. The backtracking time T2 can be calculated by the tire condition detection device 402 and the signal receiving processor 406 through the same specific algorithm to obtain a specific value. Specifically, selecting any angle of the first signal as a reference point for data conversion, and there is a backtracking time T2 between the sending time and the receiving time of the wireless signal. The backtracking time T2 can be generated by a specific algorithm, that is, the agreed backtracking time. The same algorithm is executed on the tire condition detection device 402 and the signal receiving processor 406 side, and finally a synchronized backtracking time T2 is obtained on the tire condition detection device 402 side and the signal receiving processor 406 side. The specific value is calculated based on the tire's pressure, temperature or identification code. For example, the wireless signal contains tire pressure information including pressure P, temperature T and the ID of the tire condition detection device, the backtracking time T2=sum(P+T+ID0+ID1+ID2+ID3), thus forming an agreed backtracking time.

Figure 9:
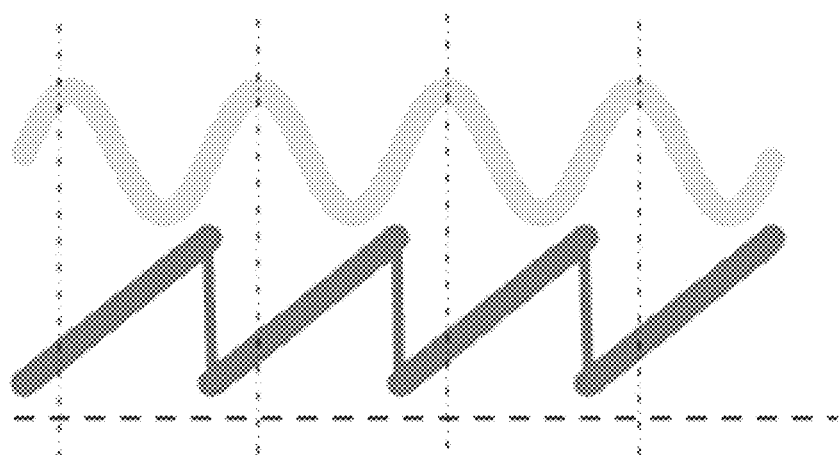
FIG. 9 shows a characteristic curve of the acceleration of the first signal and the ABS teeth number of the second signal according to an embodiment of the present disclosure.

FIG. 9 shows a characteristic curve of the acceleration of the first signal and the ABS teeth number of the second signal according to one embodiment of the present disclosure. As shown in the figure, since the tire condition detection device 402 and the tire 401 gear teeth are coaxial at the same position, the first signal acceleration characteristic curve from the tire condition detection device 402 on the top of the figure and the second signal characteristic curve at the bottom are presented synchronized patterns. Using this characteristic, if the reference point is selected to be at the same angle of the first signal characteristic curve, the corresponding coaxial second signal coded values will converge at a specific value. The position of the dotted line in the figure is the highest point of the sinusoidal curve of the selected first signal as the reference point. The wired signal contains the rotation angle information of the second signal, which is the ABS teeth number information, the rotation angle information of the second signal and the synchronized relationship between the first signal characteristic curve and the second signal characteristic curve can thus be used to realize the position identification of the tire condition detection device 402.

Figure 10:
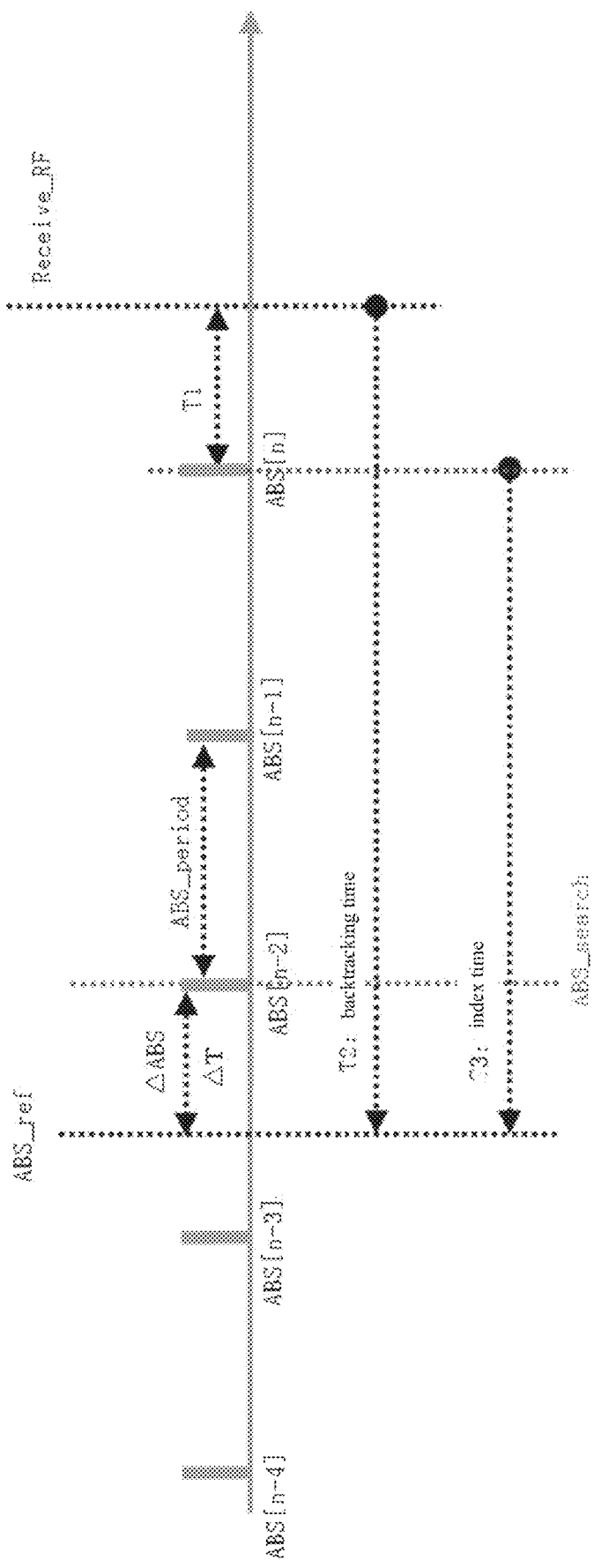
FIG. 10 shows a schematic view of obtaining a reference coded value by indexing the second signal coded value according to an embodiment of the present disclosure.

FIG. 10 shows a schematic view of obtaining a reference coded value by indexing the second signal coded value according to an embodiment of the present disclosure. As shown in the figure, Receive_RF is the current wireless signal received by the signal receiving processor 406, and ABS_ref is the reference coded value when the first signal reaches the reference point. T2 is the backtracking time, which refers to the time interval between the currently received wireless signal Receive_RF and the first signal reaching the reference point. It can be included in the wireless signal or obtained through calculation in the form of a timestamp. As shown in the figure, the coded value of the second signal of the currently obtained wired signal is recorded as ABS[n] as the starting point, indexing back, and calculating the reference coded value ABS_Ref at the reference point. A detailed description of obtaining the reference coded value will be given with reference to FIG. 6.

Indexing to the corresponding reference coded value at the reference point through the following steps:

S21, recording a time interval T1 of the currently received wireless signal and wired signal.

S22, obtaining a backtracking time T2 from a time when the first signal reaches the reference point to the time when the wireless signal is received.

S23, index time T3=backtracking time T2-time interval T1.

S24, calculating a number of coded values that need to be indexed back, which is the index time T3/the period of the second signal ABS_period rounded, and the subscript value of the indexed queue of the coded value needs to be calculated.

S25, recording the coded value ABS_search indexed in the queue of coded values according to number of backward indexes. In this embodiment, the coded value of the second signal is ABS_search=ABS[n-2].

S26. modifying the coded value ABS_search and obtaining the reference coded value ABS_ref.

Specifically, step S26 comprises:

S261, calculating the time interval ΔT between ABS_search and ABS_ref=corrected index time T3/and the period ABS_period of the second signal(taking remainder);

S262, calculating the difference value between ABS_ref and ABS_search(teeth difference between the two): ΔABS=(ΔT/ABS_period)*(ABS[n-2]-ABS[n-3]);

S263, correcting the reference coded value at the corresponding reference point, ABS_ref=ABS[n-2]-ΔABS.

It is easy to understand that every time the signal receiving processor 406 receives a wireless signal from a tire condition detection device 402, it executes step S21 to step S26 once to obtain a queue of reference coded values ABS_ref accumulated by each tire condition detection device 402. Taking four tire condition detection devices 402 installed on four tires as an example, each tire corresponds to four sets of reference coded value ABS_ref. Four tires correspond to a total of 16 sets of reference coded value ABS_ref. The degree of data deviation is analyzed for the four sets of reference coded values ABS_ref corresponding to each tire, and the minimum value of the variance is determined to be the smallest degree of deviation.

During the active learning process of the tire self-positioning system, whether the vehicle is traveling forward or reversely, the number of ABS pulses will increase, resulting in an increase in the ABS teeth number. When there is no reverse movement, the ABS corresponding to the tire self-positioning system converges around n teeth, however, when the vehicle travels in the reverse direction for a certain distance and then drives forward, this ABS teeth number group will converge at (n teeth±compensation ABS), wherein the compensation ABS is the relative offset of the ABS caused by reversing.

Figure 11:
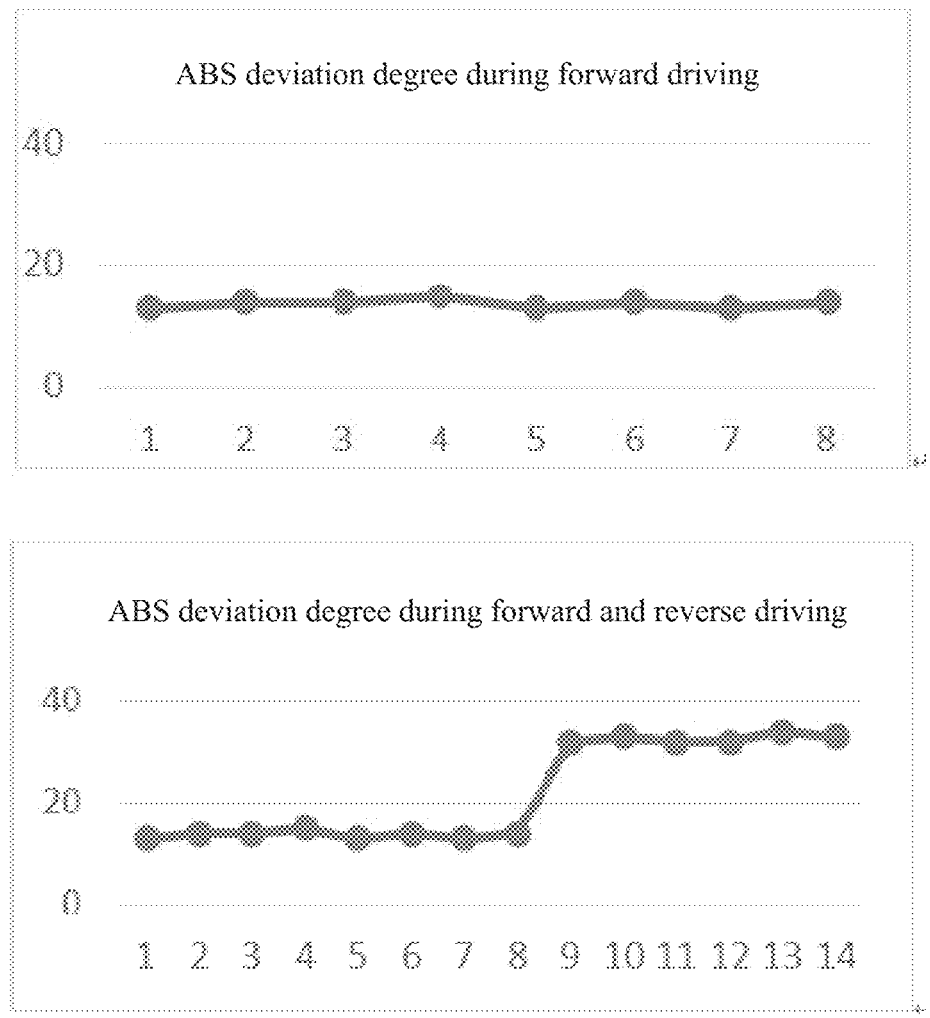
FIG. 11 shows a comparison table before and after ABS teeth number compensation according to one embodiment of the present disclosure.

FIG. 11 shows a comparison table before and after ABS teeth number compensation according to one embodiment of the present disclosure. As shown in the figure, the upper part shows that when the vehicle is traveling normally, the ABS converges at around 14; when the vehicle is traveling in the reverse direction and then travels forward again, the ABS converges at around 32. It can be calculated that the relative offset of the ABS during reverse driving is 18 teeth, and the offset is compensated, the compensation ABS in the figure below converges again around 14. Specifically, the offset of the reference coded values during reverse driving is compensated so that the queue of reference coded values maintains convergence.

Figure 12:
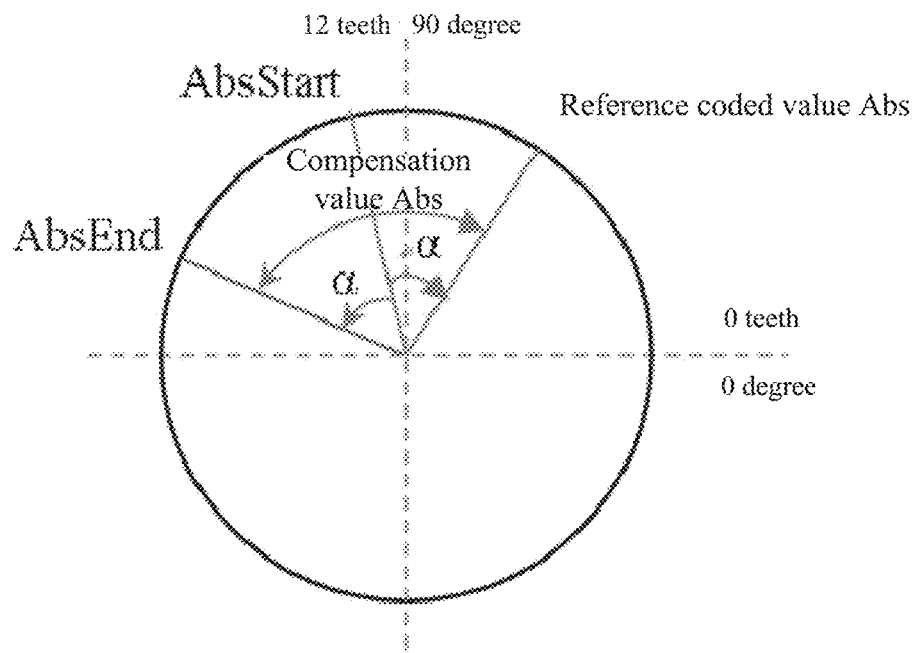
FIG. 12 shows a schematic view 1 of calculating the compensation value ABS according to an embodiment of the present disclosure.
Figure 13:
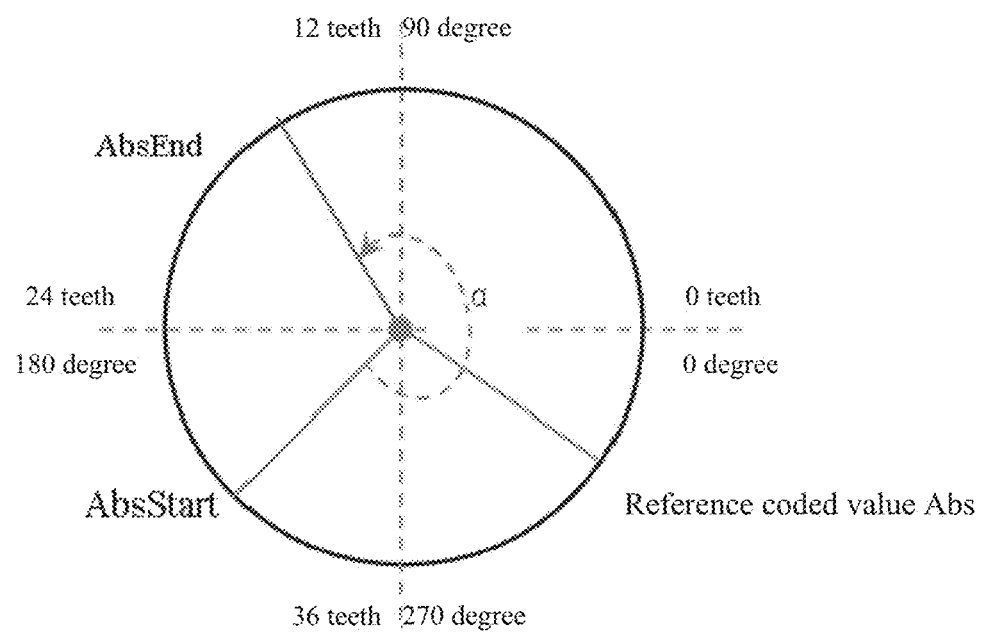
FIG. 13 shows a schematic view 2 of calculating the compensation value ABS according to an embodiment of the present disclosure.

FIG. 12 shows a schematic view 1 of calculating the compensation value ABS according to an embodiment of the present disclosure. As shown in the figure, if AbsStart≤AbsEnd, the compensation value ABS=[2*(AbsEnd−AbsStart)]/ABS_CODE_MAXVAL taking remainder. FIG. 13 shows a schematic view 2 of calculating the compensation value ABS according to an embodiment of the present disclosure. If AbsStart>AbsEnd, the compensation value ABS=ABS_CODE_MAXVAL−([2*(AbsStart−AbsEnd)])/ABS_CODE_MAXVAL.

Figure 14:
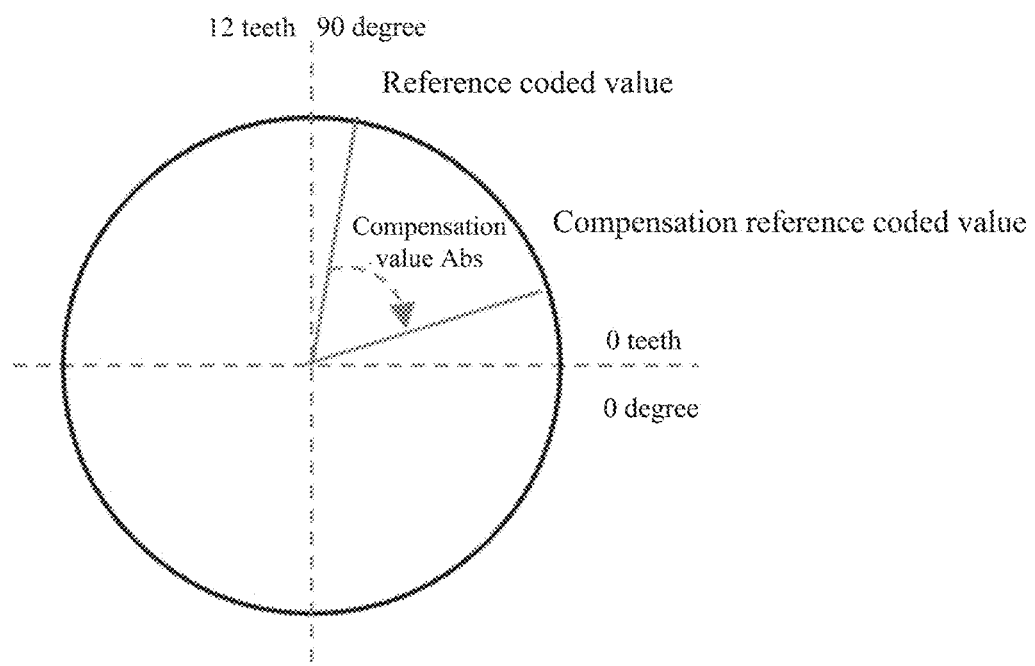
FIG. 14 shows the first schematic view of compensating for a reference coded value according to an embodiment of the present disclosure.
Figure 15:
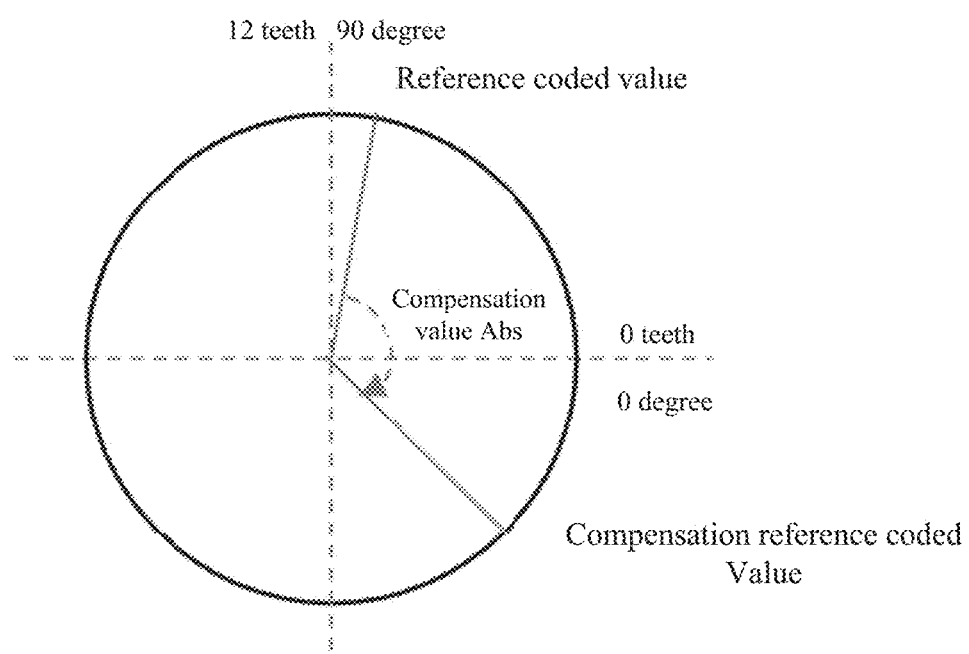
FIG. 15 shows the second schematic view of compensating for reference coded values according to an embodiment of the present disclosure.

Based on the compensation value ABS, the reference coded value obtained after the reverse rotation of the tire is compensated. FIG. 14 shows a schematic view 1 of compensating a reference coded value according to an embodiment of the present disclosure. If the current reference coded value ABS_ref≥compensation value ABS, then the compensation reference coded value ABS=reference coded value ABS_ref−compensation value ABS. FIG. 15 shows a second schematic view of compensating for reference coded values according to an embodiment of the present disclosure. If the current reference coded value ABS_ref<compensation value ABS, then the compensation reference coded value ABS=reference coded value ABS_ref+ABS_CODE_MAXVAL−compensation value ABS.

It is easy to understand that the ABS teeth number and ABS angle can be converted to each other, and the compensation value ABS can also be calculated through the ABS angle, the conversion formula for the ABS teeth number and ABS angle is as follows:

AbsAngle=(AbsPhyCurrent/ABS_CODE_MAXVAL)*360, AbsAngle is the ABS angle, AbsPhyCurrent is the ABS teeth number, and ABS_CODE_MAXVAL is the teeth number that ABS increases in one rotation of the tire.

Referring to the compensation steps for the ABS teeth number, when calculating the angle AngleStart at the start of reverse motion, AngleStart=(AbsStart/ABS_CODE_MAXVAL)*360. Calculating the angle AngleEnd at the end of the reverse movement, AngleEnd=(AbsEnd/ABS_CODE_MAXVAL)*360. By analogy, the reference coded value can also be compensated by using the ABS angle, which will not be described again here.

It should be emphasized that if the tire has multiple reverse rotations, the reference coded value obtained after each reverse rotation must be compensated to ensure the accuracy of data statistics.

In order to save power consumption, the time for the signal receiving processor 406 to perform the tire condition ID learning process should be controlled within 10 minutes. In the learning mode, the tire condition detection device sends a total of 40 packets of wireless signals, each packet of wireless signals contains 3 frames of data, and each frame of data can be indexed to the position of the reference point. The interval between packets is 15 s, and the frame interval in each packet is a random time of 60 to 200 ms. Using a random frame interval mechanism, the location where wireless signals are sent is randomly changed, which can increase the probability of wireless signals being received.

It should be noted that the signal receiving processor 406 can record the total ABS teeth number AbsTotalStart when the reverse movement starts, and accumulating from the vehicle's reverse start. Recording the total ABS teeth number AbsTotalEnd at the end of the reverse movement, and accumulating from the end of the vehicle's reverse movement. Calculating the relative ABS teeth number AbsStart=AbsTotalStart/ABS_CODE_MAXVAL when the reverse movement starts. Calculating the relative ABS teeth number at the end of the reverse movement AbsEnd=AbsTotalEnd/ABS_CODE_MAXVAL.

It will be apparent to those skilled in the art that various modifications and variations can be made to the above-mentioned exemplary embodiments of the present disclosure without departing from the spirit and scope of the present disclosure. Therefore, it is intended that the present disclosure cover the modifications and variations of this disclosure provided within the scope of the appended claims and their equivalents.

What is claimed is:

1. A tire self-positioning method, comprising steps:
    S1: data acquisition: acquiring a wireless signal and a wired signal of a tire, wherein the wireless signal can index a corresponding time when a first signal reaches a reference point, the first signal comprises at least acceleration information of the tire, the wired signal comprises a second signal and corresponding position information of the tire, and the second signal comprises at least rotation angle information of the tire;
    S2: data conversion: calculating corresponding reference rotation angle information of the tire when the first signal reaches the reference point according to the wireless signal and the wired signal that are currently received;
    S3: data compensation: compensating for the reference rotation angle information acquired after reverse rotation of the tire if the reverse rotation of the tire exists;
    S4: data statistics: repeating steps S1 to S3, and performing deviation degree statistics on acquired queue of the reference rotation angle information;
    S5: determining a specific position of the tire corresponding to the first signal according to statistical result.

2. The tire self-positioning method in claim 1, characterized in that, a rotation angle information of the tire comprises an ABS teeth number rotated by the tire, obtaining the wired signal in S1, saving the ABS teeth number, and generating coded value, a plurality of the coded values forming a queue of the coded value;
    in step S2, calculating the reference rotation angle information of the tire corresponding to the time when the first signal reaches a reference point based on the currently received wireless signal and wired signal, recording as a reference coded value;

in step S3, if there is reverse rotation of the tire, compensating for the reference coded value acquired after reverse rotation of the tire if the reverse rotation of the tire exists.

3. The tire self-positioning method in claim 2, characterized in that, the step of compensating for the reference coded value in step S3 comprises:

S31, recording ABS teeth number at a beginning of reverse movement, recorded as AbsStart, recording ABS teeth number at an end of the reverse movement, recorded as AbsEnd;

S32, calculating a compensation value ABS, the compensation value ABS=[2*(AbsEnd+n*ABS_CODE_MAXVAL−AbsStart)]/ABS_CODE_MAXVAL taking remainder;

n is a natural number, adjusting n so that AbsEnd+n*ABS_CODE_MAXVAL is greater than AbsStart, ABS_CODE_MAXVAL is teeth number that the ABS increases by one rotation of the tire;

S33, compensating for acquired reference coded value after the tire reversely rotates, if current reference coded value ABS_ref≥compensation value ABS, then compensation reference coded value ABS=reference coded value ABS_ref−compensation value ABS; if current reference coded value ABS_ref<compensation value ABS, then compensation reference coded value ABS=reference coded value ABS_ref+ABS_CODE_MAXVAL−compensation value ABS.

4. The tire self-positioning method in claim 3, characterized in that, step S31 comprises:

S311, recording total ABS teeth number at the beginning of the reverse movement, recorded as AbsTotalStart, recording the total ABS teeth number at the end of the reverse movement, recorded as AbsTotalEnd;

S312, calculating ABS teeth number at the beginning of the reverse movement, AbsStart=AbsTotalStart/ABS_CODE_MAXVAL taking remainder, calculating ABS teeth number at the end of the reverse movement, AbsEnd=AbsTotalEnd/ABS_CODE_MAXVAL taking remainder.

5. The tire self-positioning method in claim 2, characterized in that, the step of compensating for the reference coded value in step S3 comprises:

S31', recording total ABS teeth number at a beginning of reverse movement, recorded as AbsTotalStart, recording the total number of ABS teeth at an end of the reverse movement, recorded as AbsTotalEnd;

S32', calculating an added cumulative ABS teeth number during the reverse movement, AbsTotalDelta-AbsTotalEnd-AbsTotalStart;

S33', compensating for acquired reference coded value after the tire reversely rotates, and compensation reference coded value ABS=(reference code value ABS_ref+(ABS_CODE_MAXVAL*n)−(2*AbsTotalDelta)]/ABS_CODE_MAXVAL taking remainder;

wherein, ABS_CODE_MAXVAL is the teeth number that ABS increases in one rotation of the tire, n is a natural number, and adjusting n to make the reference coded value ABS_ref+(ABS_CODE_MAXVAL*n) greater than 2*AbsTotalDelta.

6. The tire self-positioning method in claim 2, characterized in that, in step S3, if the tire has n reverse rotations, acquired reference coded value after n reverse rotations needs to be compensated, comprising the steps:

recording total ABS teeth number at a beginning of a first reverse movement, recorded as AbsTotalStart 1, recording the total ABS teeth number at an end of the first reverse movement, recorded as AbsTotalEnd 1, calculating an added ABS teeth number AbsTotalDelta 1=AbsTotalEnd 1−AbsTotalStart 1 during the first reverse movement;

according to the above steps, recording the ABS teeth number increased from a second reverse movement to an nth reverse movement, accumulating the ABS teeth number increased from the first reverse movement to the nth reverse movement, an increased accumulated ABS teeth number AbsTotalDelta=AbsTotalDelta 1+AbsTotalDelta 2+ . . . +AbsTotalDelta n;

adjusting the total ABS teeth number AbsTotalAdjusted= (reference coded value ABS_ref+ (ABS_CODE_MAXVAL*n)−2*AbsTotalDelta)/ABS_CODE_MAXVAL taking remainder, n is a natural number, adjusting value of n so that the reference coded value ABS_ref+(ABS_CODE_MAXVAL*n) is greater than 2*AbsTotalDelta;

compensation reference coded value ABS=adjusted total ABS teeth number AbsTotalAdjusted/ABS_CODE_MAXVAL taking remainder;

the reference coded value ABS_ref is compensated by compensating the reference coded value ABS.

7. The tire self-positioning method in claim 2, characterized in that, step S2 comprises:

S21, recording a time interval T1 of the currently received wireless signal and wired signal;

S22, obtaining a backtracking time T2 from a time when the first signal reaches the reference point to the time when the wireless signal is received;

S23, index time T3=backtracking time T2−time interval T1;

S24, calculating a number of coded values that need to be indexed back, which is the index time T3/the period of the second signal ABS_period rounded;

S25, recording the coded value ABS_search indexed in the queue of coded values according to number of backward indexes;

S26, modifying the coded value ABS_search and obtaining the reference coded value ABS_ref.

8. The tire self-positioning method in claim 7, characterized in that, the backtracking time T2 is a set fixed value, or a specific value calculated by a specific algorithm.

9. A tire self-positioning system, performing the tire self-positioning method according to claim 1, characterized in that, the tire self-positioning system comprises:

a tire;

a tire condition detection device, provided on the tire, configured to collect the first signal and pressure, temperature and identification code of the tire, and generating the wireless signal;

a second signal sensor, provided on the tire and configured to collect the second signal;

a second signal controller, electrically connected to the second signal sensor, the second signal controller receiving the second signal and generating a wired signal, the wired signal including a coded value corresponding to the second signal and position information of the tire where the second signal sensor is located;

a communication bus and a signal receiving processor, the signal receiving processor receives the wired signal through the communication bus, the signal receiving processor receiving the wireless signal, the signal receiving processor performing steps S3 to S6 according to the wireless signal and the wired signal.

10. The tire self-positioning system of claim 9, characterized in that, a first signal collection sensor is an acceleration sensor, and s second signal sensor is an ABS gear tooth pulse sensor.

\* \* \* \* \*